United States Patent
Dietz et al.

(10) Patent No.: US 9,231,894 B1
(45) Date of Patent: Jan. 5, 2016

(54) METHOD AND DEVICES FOR INSTANT MESSAGE CLIENT SWAP

(71) Applicant: Infinite Convergence Solutions, Inc., Arlington Heights, IL (US)

(72) Inventors: Geoffrey Dietz, Hoffman Estates, IL (US); Thomas B Hart, West Dundee, IL (US); Daniel L Price, Cary, IL (US)

(73) Assignee: Infinite Convergence Solutions, Inc., Arlington Heights, IL (US)

( * ) Notice: Subject to any disclaimer, the term of this patent is extended or adjusted under 35 U.S.C. 154(b) by 0 days.

(21) Appl. No.: 14/456,850

(22) Filed: Aug. 11, 2014

Related U.S. Application Data

(60) Provisional application No. 61/865,968, filed on Aug. 14, 2013.

(51) Int. Cl.
  *G06F 15/16* (2006.01)
  *H04L 12/58* (2006.01)
  *H04L 29/06* (2006.01)

(52) U.S. Cl.
  CPC .............. *H04L 51/04* (2013.01); *H04L 67/42* (2013.01)

(58) Field of Classification Search
  None
  See application file for complete search history.

(56) References Cited

U.S. PATENT DOCUMENTS

| | | | |
|---|---|---|---|
| 8,180,933 B2 * | 5/2012 | Krantz et al. | 710/16 |
| 8,244,878 B2 * | 8/2012 | Heron et al. | 709/227 |
| 8,370,431 B1 * | 2/2013 | Wang et al. | 709/204 |
| 9,100,359 B2 * | 8/2015 | Altberg et al. | |
| 2007/0203995 A1 * | 8/2007 | Wang et al. | 709/206 |
| 2008/0255946 A1 * | 10/2008 | Altberg et al. | 705/14 |
| 2008/0313297 A1 * | 12/2008 | Heron et al. | 709/207 |
| 2010/0185787 A1 * | 7/2010 | Krantz et al. | 710/19 |
| 2013/0036183 A1 * | 2/2013 | Lu | 709/206 |
| 2013/0254317 A1 * | 9/2013 | Altberg et al. | 709/206 |

OTHER PUBLICATIONS

A.B. Roach, Request for Comments 3265—Session Initiation Protocol (SIP)—Specific Even Notification (IETF RFC 3265), The Internet Society, Jun. 2002.
E. Burger, Request for Comments 5438—Instant Message Disposition Notification (IMDN) (IETF RFC 5438), IETF Trust, Mar. 2009.
GSM Association, Official Document RCC.07—Rich Communication Suite 5.1 Advanced Communications Services and Client Specification Version 2.0, Section 2.11 and Appendix B.1, May 3, 2013.
GSM Association, Official Document RCC.07—Rich Communication Suite 5.1 Advanced Communications Services and Client Specification Version 5.0, Section 2.11 , May 7, 2014.

* cited by examiner

*Primary Examiner* — Brian P Whipple
(74) *Attorney, Agent, or Firm* — Russell E. Sorber

(57) ABSTRACT

This innovation relates to a method as well as server and client devices to allow a single user to swap between devices in real-time within the same instant message session.

6 Claims, 5 Drawing Sheets

METHOD AND DEVICES FOR INSTANT MESSAGE CLIENT SWAP

CROSS-REFERENCE TO RELATED APPLICATIONS

This application claims the benefit of U.S. Provisional Patent Application 61/865,968 filed on Aug. 14, 2013 by the present inventors.

FEDERALLY SPONSORED RESEARCH

None.

SEQUENCE LISTING

None.

FIELD OF THE INVENTION

This invention relates to telecommunications infrastructure and devices which enable instant message chat.

BACKGROUND OF THE INVENTION

This innovation relates to a method as well as server and client devices to allow a single subscriber of telecommunications services to swap between devices in real-time within the same instant message session. Existing telecommunications standards GSMA RCS v5.1 and OMA CPM v2.0 currently have multi-device scenarios, but only allow one active device per user in an active chat session. In many cases a SIP CANCEL or other session cancellation message is explicitly sent to the secondary user devices not involved in the session. SIP protocol is described by the IETF RFC document 3265. RCS v5.1 Advanced Communications Services and Client Specifications v 2.0 dated May 3, 2013, details these scenarios in Appendix B. The method described in the RCS specification limits full use of the subscribers client devices. Other known methods for users with multiple devices synchronize the message content and session information using the long term message store after the chat session has ended and allow the user, with a different client to re-open a similar session. The message history for the session is often not available in the new client device at the time the user wants to switch device, or is significantly delayed. What is needed is a method for the subscriber to switch to a different device in real-time, while the chat session is still active.

SUMMARY OF INVENTION

What is taught is a method to allow a telecommunications subscriber to swap client devices while maintaining an ongoing chat session in real time. The method may optionally also include the Instant Message (IM) Server notifying other available subscriber client devices in real time of the contents of messages sent by the other client devices controlled by the same subscriber. The method may also include an enhanced IM server notifying all available subscriber client devices in real time of the contents of messages received by the other subscriber controlled clients. The method also includes the IM Server notifying other available subscriber client devices of the disposition notification messages, such as read reply and Delivery Notification originally directed to any of the other subscriber controlled client devices.

An enhanced Instant Message Server apparatus which supports this new method is also described. The enhanced IM server, must additionally allow multiple clients of the same subscriber to join the same ongoing chat session and the server must maintain the chat session even if one or (in the case of group chat) all of the client devices from a particular subscriber drop from the session. The server must additionally allow a client of a dropped subscriber to rejoin the ongoing session.

It will be necessary for a instant messaging client apparatus to allow multiple other clients for a single user within the same Instant Message session. This includes ability to join and rejoin a session that has other clients of the same subscriber. In one embodiment, the client accepts a SIP INVITE message regardless of other clients of the same subscriber that may have previously accepted the same invitations. The instant message client may also be modified to receive copies of messages sent and received to and from other clients of the same subscriber with copies of these messaged received by way of the Instant Message Server apparatus. The client may also be modified to accept copies of Instant Message Disposition Notifications, such as Delivery Report and Read Notifications that are directed toward another client of the same subscriber.

BRIEF DESCRIPTION OF DRAWINGS

In FIG. 4, Subscriber A, client 1 then sends a message to the group which is copied to all client devices by the IM Server including Subscriber A client 2, Subscriber B client 1, subscriber B client 2 and Subscriber C's only client, client 1. Subscriber B client 1 is configured to send a delivery report and sends the deliver report back to Subscriber A Client 1 via the IM Server. The IMServer also sends copies of the delivery report to Subscriber A Client 2 and Subscriber B Client 2. Subscriber C also sends a delivery report for the above message to Subscriber A Client 1. The IM Server also sends a copy of subscriber C's delivery report to Subscriber A Client 2. FIG. 5 shows a particular embodiment where a SIP BYE message is then sent by Subscriber A client 2 to end the chat session. The IM Server then closes the session to the other four clients.

GLOSSARY

Figure 1:
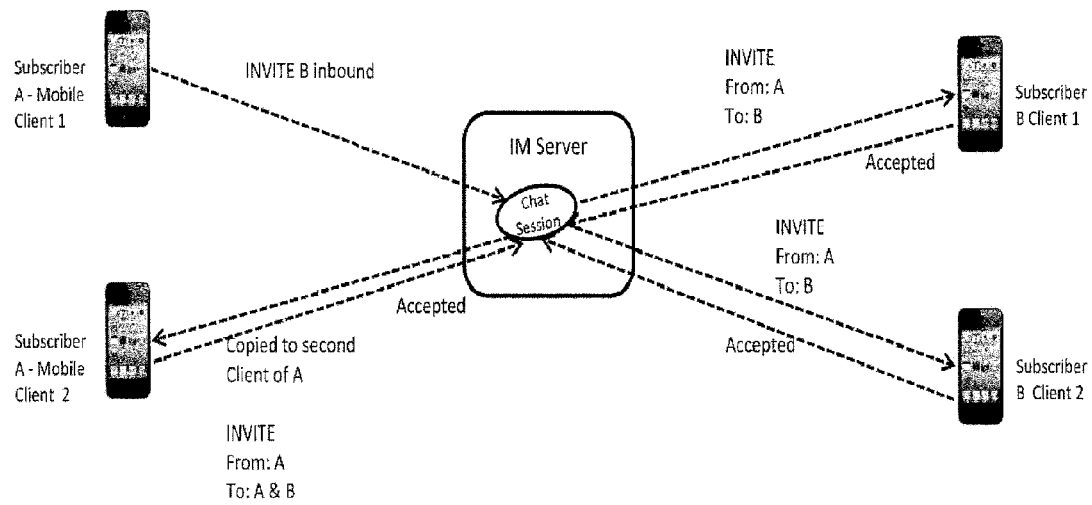
FIG. 1 is a high level diagram of subscriber A inviting subscriber B to a chat session by way of an IM Server. The IM Servers sends invitations to all clients owned by subscriber B, usually via a CSCF network element (not shown) as well as to another client owned by subscriber A.

CLIENT Hardware or Software or a combination such as on a mobile device or tablet device that is capabile of exchanging information with a remote server.
HTTP Hypertext Transfer Protocol
IETF Internet Engineering Task Force
IP Internet Protocol IMS Instant Message Server
IMS Core The IMS core network predominantly consists of the Call Session Control Function (CSCF) and the Home Subscriber Server (HSS)
MDN Mobile Directory Number
NOTIFY In the SIP protocol NOTIFY messages are sent to inform subscribers of changes in state to which the subscriber has a subscription.
RFC IETF Request for Comments Document.
RCS Rich Communications Services is a global initiative to deploy services across telecommunications operators. For consumers, it combines voice and SMS with instant messaging or chat, live video sharing and file transfer across all devices and networks, using mobile devices.
SIMPLE A methodology and set of extensions to SIP supporting the Instant Messaging requirements defined by IETF
SDP Session Description Protocol (SDP) is a format for describing streaming media initialization parameters.
SIP Session Initiation Protocol is an IETF-defined signaling protocol widely used for controlling communications sessions such as voice and video calls over Internet
SUBSCRIBER The end user of a telecommunications service.
X-CSCF A generic Call Session Control Function is a piece of telecommunication infrastructure which could include an Interrogating Call Session Control Function (I-CSCF) a Proxy Call Session Control Function (P-CSCF) or a Serving Call Session Control Function (S-CSCF)

DETAILED DESCRIPTION

This innovation defines the method, server and clients which support a subscriber swapping client devices in real time within a single telecommunications chat session.

The IM Server first determines how many client devices a subscriber has and of those which are available and registered. Current art partly covers this in that all devices are invite to the session, but only one client is allowed to join the session per subscriber in prior art. Oftentimes, the S-CSCF may fork the requests. That is sufficient based on the known standards approach with only one client in the session but insufficient for client swapping. To allow all of the subscriber's clients in the session at the same time as propose in the disclosure for a better user experience requires the IM Server to be aware of all the client directly. This is so that the IM Server can invite and manage the connection for each of the clients directly. There are multiple methods available. For Messaging scenarios without IMS Core components such as a CSCF, the RCS/CPM clients will register directly with the IM Server and this information is used to know the RCS/CPM devices for the user. In IMS Core scenarios the IM Server can register for $3^{rd}$ Party registrations that can be used to keep track of registered devices. Third the IM Server can remember in the subscriber database the details of each client as SIP OPTIONS and SIP INVITE messages are received from the subscribers. In this case the devices may not be register, but the devices can be invited to chat sessions anyway. The invitations may just fail for specific devices that are not available. Also, the IM Server may need to know about non-RCS/CPM clients that the subscriber may have. These addresses are best provisioned by the subscriber through a web portal. Presence APIs and or other subscription methods at the applicable presence server can bet used by the IM Server to determine availability if supported. Otherwise, these other clients types can just be added to the chat session and that may fail if the specific client is unavailable client. The actual messaging required to do that is specific to the type of client. i.e. that referred to the XMPP or other standards for that client connection.

For the best known embodiment, the clients should automatically accept all chat sessions, though clients may also be accommodated by a proprietary protocol extension in the form of a header field or new parameter can be used to indicate to the clients that this is a session that may include multiple devices for each subscriber to trigger the client to automatically accept the session. In the case of RCS/CPM a new feature tag for multi-client can be added to the Supported SIP header in the SIP INVITE command (and 200 OK INVITE response). The SIP "Supported" header field enumerates all the extensions supported by the client or server. The SIP "Supported" header field contains a list of option tags, that are understood by the client or server. A client compliant to the SIP specification only include option tags corresponding to standards, if empty, it means that no extensions are supported. The inventor discloses a non-standard header field option tag with a unique value such as, but not limited to "multi-client". This header would include, for example, the simplified header;

Supported: multi-client

The indicator may also be similar proprietary option tag value to indicate the subscriber has multiple clients. It is noted that there may be several standard or nonstandard option tag values additionally included in the "Supported" header. An proprietary SDP 'a' parameter field, as described by the IETF in RFC 4566 may also be used by adding a proprietary parameter to the SDP protocol to identify a multi-client session. e.g. a=multi-client However, the SIP extension feature tag is recommended based upon the inventors experimentation. The billing and other handle should be modified to be common per subscriber, not per client, to ensure that the subscriber is only actually charged once for each message and not once for each copy of the same message. The actually billing any be operator specific and this disclosure does not dictate a specific billing method, but just points out that some message handling will be subscriber specific (once) and some handling is client specific (multiple times per subscriber).

In this innovation, when a subscriber initiates or is invited to a chat session on one device, the IM Server should also invite the subscriber's other devices to the chat session so that the subscriber can also easily switch devices later in the session. This is shown in FIG. 1 and is nonstandard behavior for an IM Server.

Figure 2:
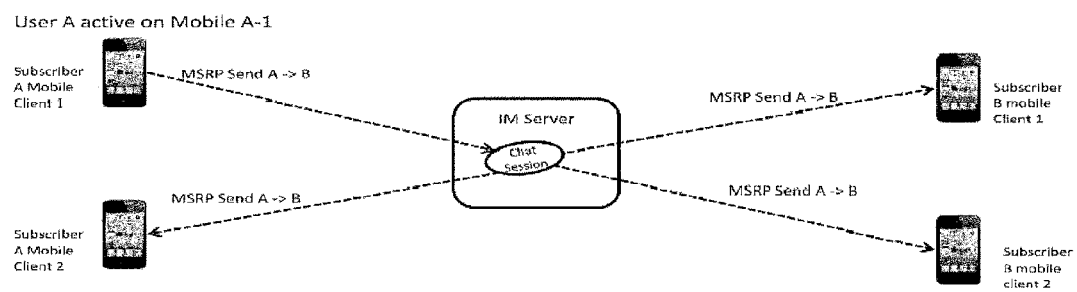
FIG. 2 shows communication between the clients after the session has started. The IM Server directs the SEND message from Subscriber A, Client 1 to multiple devices owned by Subscriber B as well as to Client 2 of Subscriber A.
Figure 3:
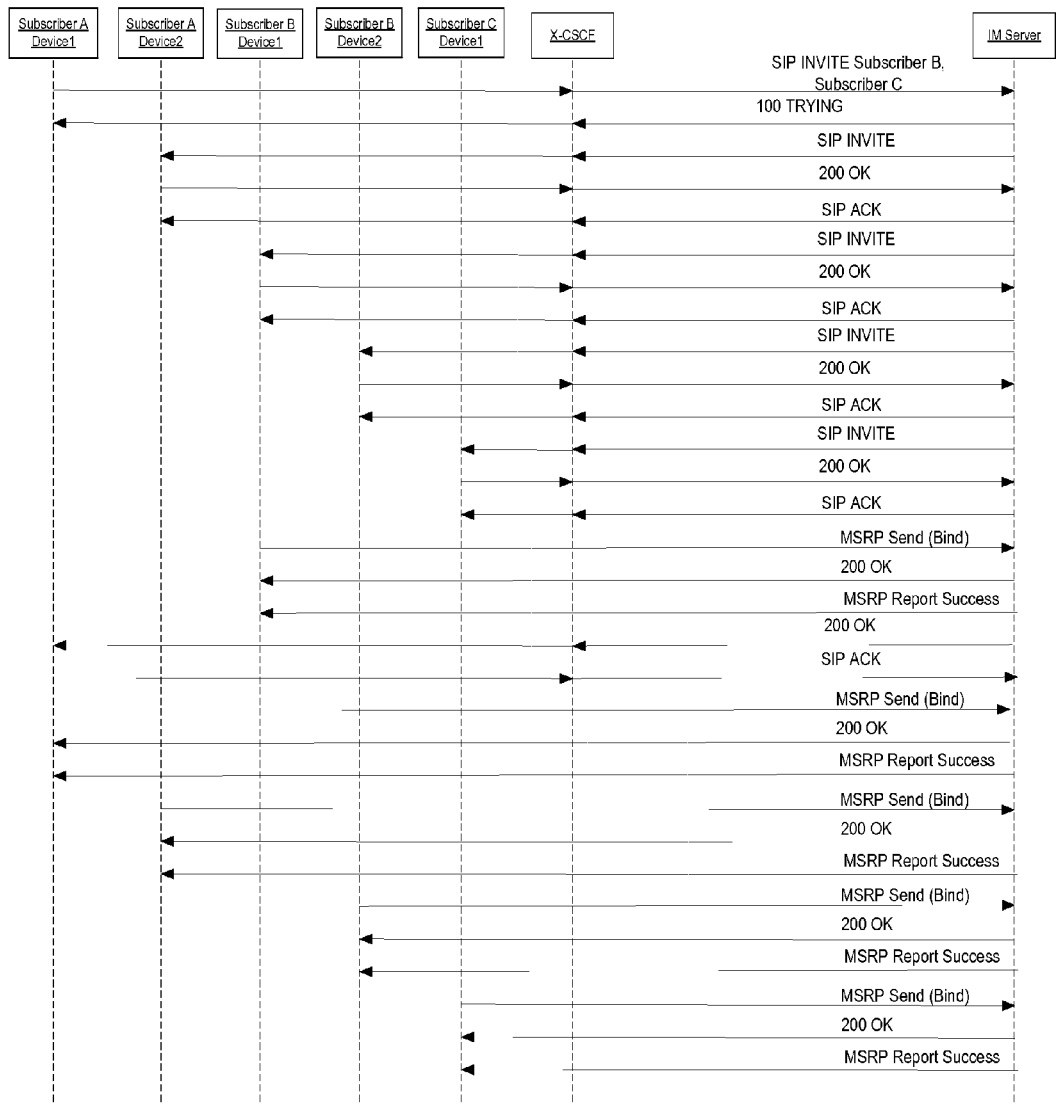
FIG. 3, FIG. 4 and FIG. 5 show different sections of a single chat session ladder diagram between the IM Server, the X-CSCF and five client devices controlled by three different subscribers. Note that, in FIG. 3 after Subscriber A, Device 1 initiates the chat, the other client device controlled by Subscriber A, as well as client devices controlled by subscribers B and C also get invitations from the IM Server for the same chat session via the X-CSCF. All client devices, including Subscriber A, Device 2, receive MSRP Send commands from the IM Server to bind them to the session.
Figure 4:
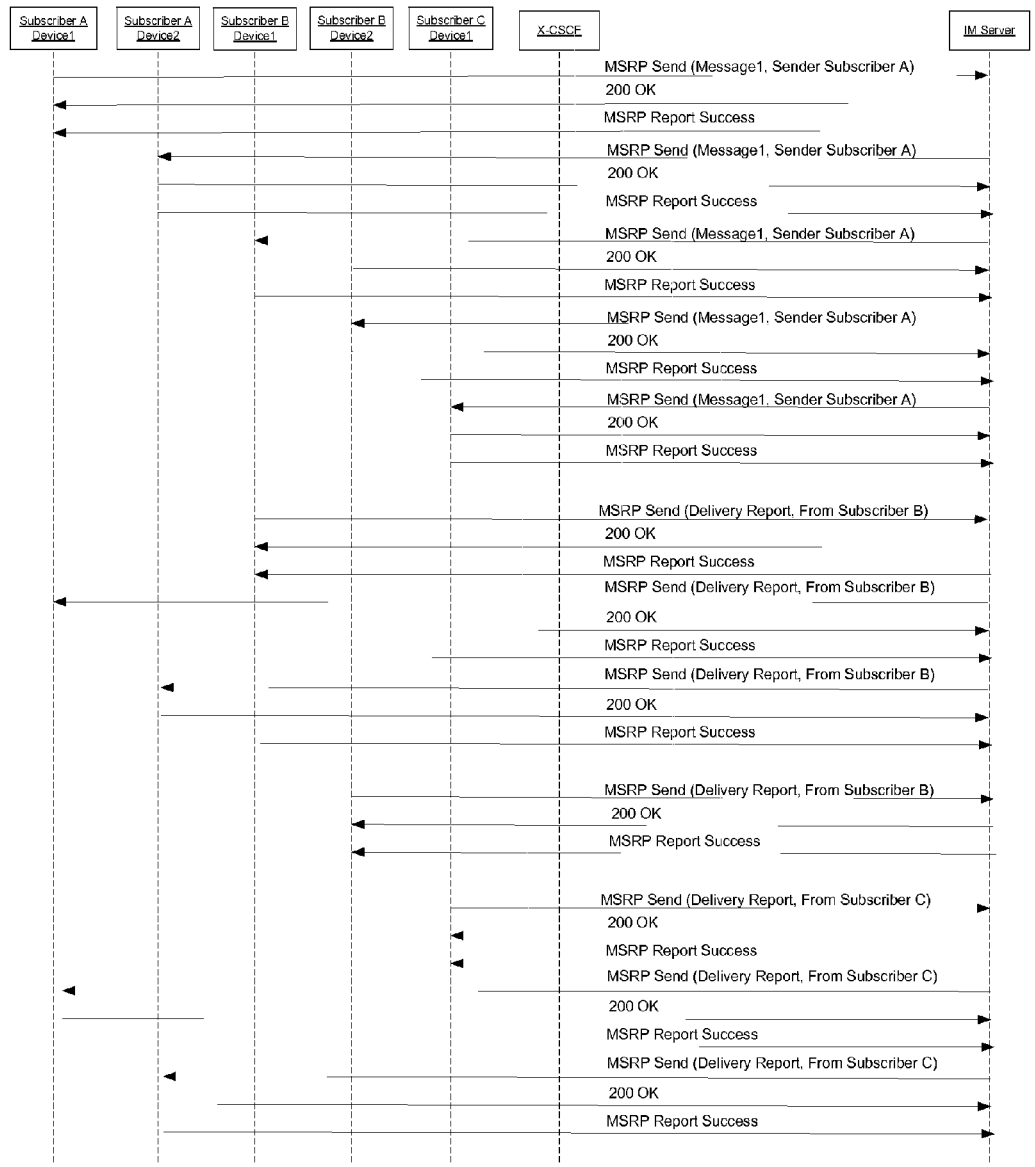
Figure 5:
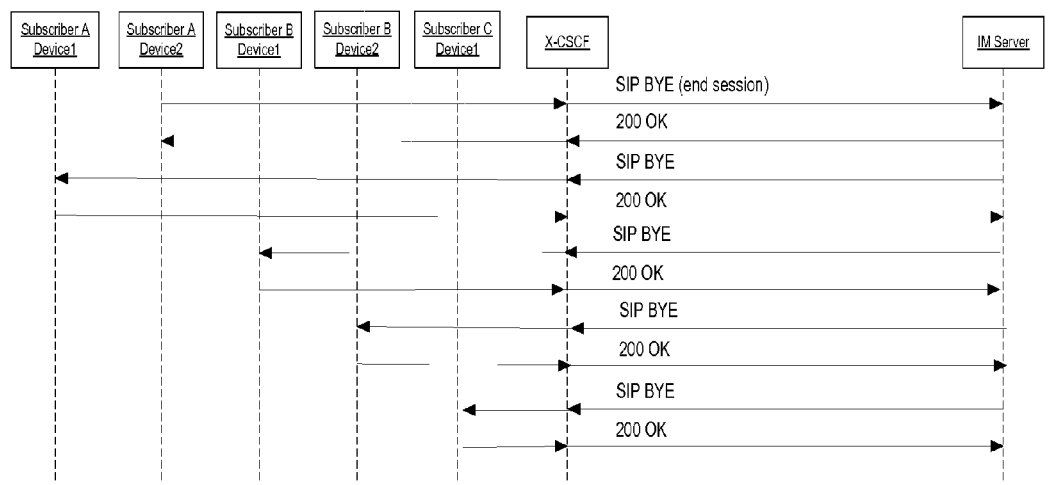

It is further taught that messages from a subscriber on one client are sent by the server to the subscriber's other clients as recipients. This is shown in FIG. 2 as well as FIG. 3. In this case, the recipient clients should be modified to recognize that the messages are from the same MDN or sender address as provisioned for the recipient client, so the other clients of the same subscriber record the message as a sent message. Messages from other subscribers can be handled as in the prior art by the other clients. This allows all clients to show all messages as sent and received the same on all devices and it will be correct on a per subscriber basis. It is further taught that the Instant Message Disposition Notification (IMDN) messages targeted for one of the subscriber clients be sent by the server to all of the subscriber's clients. Added Messaging for IMDN is shown in FIG. 3. Instant message deposition notifications may, for example, include a message delivery notification, a display notification, a read reply report, a deletion notification of the message, or the notification that the recipient has refused to provide a message disposition to the sender of the original message. Read Reply, read receipt, and read reply report are used interchangeable in this document and refer to messages that are automatically generated following the display and presumed reading of a message.

To facilitate subscribers turning on (and registering) a new device, it is better if the IM Server store messages for offline devices for the duration of the active session. This storage could be done once per session participant as an optimization even if there are multiple offline devices. If no offline device becomes available during the active session these messages may be discarded.

The IM Server should store the messages during the active session so that if another subscriber device is turned on during the session, the device can be quickly brought up to speed and the user can switch to this device now too. After the session the offline client device can retrieve the session messages from the syncing with the long term message store on the IM Server if enabled. To facilitate restarting a chat session or for long lived chant session where a long term message store may not be available, Store and Forward can be performed for every device even after the original active session ended, so that all client will still have the ability to restart a similar session and have the full context of the session.

XMPP and other client protocol types for the subscriber can also be invited to the session as supported by the IM Server and per the protocol of the client. Even if these clients don't support auto accepting the session as taught above, the IM Server can store the messages for the these clients for the duration of the session. Then if the subscriber decided to switch to that client they can accept the chat invitation waiting at the client and the IM Server will deliver the stored messages to bring the client up to date.

What we claim is:

1. A method for a first messaging chat subscriber to receive instant message disposition messages on multiple client devices controlled by said first subscriber while maintaining an ongoing single chat session in real time comprising:
   a) a message server determining how many client devices a first subscriber controls;
   b) the message server inviting multiple first subscriber controlled client devices to the chat session;
   c) multiple client devices assigned to the same first subscriber accepting an invitation to the same chat session invitation;
   d) the subscriber communicating on one of the subscriber controlled client devices;
   e) the message server accepting input from the subscriber via one of the client devices;
   f) the message server forwarding the message to a second subscriber;
   g) the message server receiving an automatic instant message disposition notification from the second subscriber;
   h) the message server forwarding the disposition notification received from the second subscriber to all of the active clients assigned to the first subscriber.

2. The method of claim 1 where the disposition notification messages comprise automatically generated read report notification.

3. The method of claim 1 where the disposition notification messages comprise automatically generated delivery notification.

4. An instant message server apparatus comprising: a storage device comprising computer executable program code; and a processor coupled to the storage device, wherein the processor executes the computer executable program code to establish message chat sessions between multiple client devices further comprising a session between multiple client devices which belong to a single subscriber which exist in a single chat session and where the server delivers instant message disposition notifications to two or more client devices belonging to a single subscriber that are active in a single chat session.

5. The instant message server of claim 4 where the computer executable program code additionally comprises indicating to client devices that there are multiple subscriber controlled clients involved in the single chat session used by the single subscriber by use of a proprietary SIP header file option tag.

6. The instant message server of claim 4 where the computer executable program code additionally comprises indicating to client devices that there are multiple subscriber controlled clients involved in the single chat session used by the single subscriber by using a proprietary SDP parameter in a SIP message sent from the instant message server apparatus to the client devices.

* * * * *